United States Patent [19]

McCloskey et al.

[11] Patent Number: 5,973,102
[45] Date of Patent: Oct. 26, 1999

[54] STATIC RESISTANT POLYCARBONATE COMPOSITIONS

[75] Inventors: Patrick Joseph McCloskey, Watervliet; David Michel Dardaris, Ballston Spa; George Thomas Seeger, Scotia, all of N.Y.; Colette Clarissa Knight, Aachen, Germany; Susan Adams Nye, Feura Bush, N.Y.

[73] Assignee: General Electric Company, Schenectady, N.Y.

[21] Appl. No.: 09/161,563

[22] Filed: Sep. 28, 1998

Related U.S. Application Data

[63] Continuation-in-part of application No. 08/989,552, Dec. 12, 1997, abandoned.

[51] Int. Cl.⁶ ..................................................... C08G 64/00
[52] U.S. Cl. .............................................. 528/196; 528/199
[58] Field of Search ...................................... 528/196, 198

[56] References Cited

U.S. PATENT DOCUMENTS

| | | | |
|---|---|---|---|
| 5,606,007 | 2/1997 | Sakashita et al. | 528/176 |
| 5,717,021 | 2/1998 | Huang et al. | 524/484 |

*Primary Examiner*—Terressa Mosley
*Attorney, Agent, or Firm*—Noreen C. Johnson; Douglas E. Stoner

[57] ABSTRACT

A static resistant polycarbonate composition is provided comprising a polycarbonate, at least one mold release agent, and at least one antistatic agent. The disclosed composition optionally comprises a heat stabilizer. Static resistant compact disks are molded from the polycarbonate composition.

22 Claims, No Drawings

STATIC RESISTANT POLYCARBONATE COMPOSITIONS

This application is a continuation-in-part of application Ser. No. 08/989,552, filed Dec. 12, 1997 now abandoned.

BACKGROUND OF THE INVENTION

The present invention relates to a substantially static resistant polycarbonate composition.

Polycarbonate compositions are the materials of choice for making optical information storage media. Optical information storage media include such articles as compact disks, audio disks, laser disks, optical disk memories and magnetic-to-optical disks to which information may be written and from which it may be read by laser. Such media may be produced from polycarbonates by art-recognized means.

Polycarbonate compositions, prepared by a melt condensation process as disclosed in, for example, U.S. Pat. No. 5,606,008, are becoming the materials of choice in manufacturing compact disks (CDs). Good antistatic performance is critical for polycarbonate compositions used to mold compact disks as well as for other polycarbonate applications where light transmission is critical to performance. High static charge generated during injection molding of compact disks can result in molded parts which will attract dust and compromise the final quality of such disks. High static charge can also result in attraction between disks resulting in situations where disks appear to stick together during the transfer process, e.g. from an injection molder, resulting in stoppage and yield losses during CD manufacturing. For CD applications where a re-writeable substrate is spin-coated onto a disk surface, low static charge is critical for uniform wetting of the re-writeable layer. However, a characteristic of CDs manufactured from polycarbonate made by a melt condensation process, as disclosed in U.S. Pat. No. 5,606,008, is generation of a high negative static charge, typically <−2.0 kV. For the successful use of polycarbonate compositions in making compact disks the CDs preferably must have a static charge between about −2 kV and about +2.0 kV.

Antistatic polycarbonate compositions are disclosed in Japanese Patent Application No. JP62207358. These compositions are used for high-density optical information recording media such as CDs, video disks, etc., and are reported to have suitable antistatic properties. The antistatic agents in these compositions are limited to acidic, partially esterified phosphoric acid derivatives used at the level of 0.01 wt. % to 4.8 wt. % parts based on the polycarbonate.

There is thus a need for a polycarbonate composition, derived from a polycarbonate made by a melt condensation process, which, when used to make CDs, will limit the static charge to between about −2 kV and about +2 kV. There is also a need for a polycarbonate composition containing a non-acidic antistatic agent. There is also a need for a polycarbonate composition containing a reduced amount of antistatic agent. There is further a need for molded articles comprising optical information storage media, particularly CDs, made from said polycarbonate compositions having static charge limited to between about −2 kV and about +2 kV.

SUMMARY OF THE INVENTION

The above-mentioned needs are met by the invention of the present application. It has been surprisingly found that using less than about 0.05%, by weight of the polycarbonate, of a non-acidic antistatic agent in the polycarbonate composition yields a composition which limits the static charge of molded CDs to between about −2 kV and about +2 kV. This result is surprising since non-acidic antistatic agents are usually effective only when used in amounts of more than about 0.05% by weight of the main resinous ingredient (such as polyvinyl chloride (PVC), polyethylene, or polycarbonate (PC)), of a given composition.

The present invention provides a polycarbonate composition with good antistatic performance comprising, (a) polycarbonate; (b) from about 0.01% to about 0.1% by weight of the polycarbonate of at least one mold release agent; (c) from 0% to about 0.05% by weight of the polycarbonate of at least one heat stabilizer; and (d) from about 0.007% to about 0.05% by weight of the polycarbonate of at least one antistatic agent, wherein said antistatic agent is distearylhydroxylamine, triphenyl amine, tri-n-octylphosphine oxide, triphenyl phosphine oxide, pyridine N-oxide, ethoxylated sorbitan monolaurate, $$R^1\text{---}(O\text{---}CH\text{---}CH_2)_j\text{---}(O\text{---}CH\text{---}CH_2)_k\text{---}(O\text{---}CH\text{---}CH_2)_n\text{---}O\text{---}R^2,$$
$$\overset{|}{R^3} \quad\quad \overset{|}{R^4} \quad\quad \overset{|}{R^5}$$

or

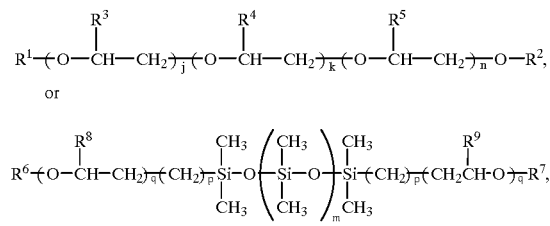

wherein $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or —tetrahydrofurfuryl; $R^3$, $R^4$, and $R^5$ each independently represent —H or —$CH_3$; $R^6$ and $R^7$ independently represent —H, —$C_{1-22}$ alkyl, or —$COC_{1-21}$ alkyl; $R^8$ and $R^9$ independently represent —H or —$CH_3$; j, k, and n each independently represent an integer from about 2 to about 200; p independently at each occurrence represents an integer from about 1 to about 6; q independently at each occurrence represents an integer from about 1 to about 100; and m represents an integer from about 1 to about 100.

The invention also provides an optical information storage medium comprising the said polycarbonate composition. Still yet, the invention further provides compact discs comprising the said polycarbonate composition.

DETAILED DESCRIPTION OF THE INVENTION

Polycarbonate as used in the present invention comprises multiple structural units represented by the formula $$[\text{---}O\text{---}A^1\text{---}O\text{---}C(O)\text{---}] \quad\quad \text{Formula I}$$

wherein $A^1$ is a divalent aromatic hydrocarbon radical. Suitable $A^1$ radicals include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula $$\text{---}A^2\text{---}Y\text{---}A^3\text{---} \quad\quad \text{Formula II}$$

wherein each of $A^2$ and $A^3$ is a mono cyclic divalent aromatic hydrocarbon radical and Y is a bridging hydrocarbon radical in which one or two atoms separate $A^2$ from $A^3$.

The free valence bonds in formula II are usually in the meta or para positions of $A^2$ and $A^3$ in relation to Y. Compounds in which $A^1$ has formula II are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula II, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, separate $A^2$ from $A^3$. The preferred embodiment is one in which one atom separates $A^2$ from $A^3$. Illustrative radicals of this type are methylene, cyclohexyl-methylene, 2-[2.2.1]-bicycloheptyl methylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred bisphenol is 2,2-bis(4-hydroxyphenyl)propane ("BPA"), in which Y is isopropylidene and $A^2$ and $A^3$ are each p-phenylene. A detailed description of polycarbonates used in the instant invention is described in U.S. Pat. Nos. 4,125,572; 3,028,365; 3,334,154; and 3,915,926; all of which are incorporated herein by reference.

One embodiment of the present invention provides a polycarbonate composition comprising at least one mold release agent. A mold release agent, as used herein, is a compound which generally when incorporated in a composition makes the composition non-sticky thereby increasing its ability to be easily released from a mold during injection molding.

The polycarbonate compositions of the present invention comprise from about 0.01% to about 0.1% by weight of the polycarbonate of at least one mold release agent. The preferred amount of mold release agent is from about 0.015% to about 0.06% by weight of the polycarbonate. The most preferred amount of the mold release agent is from about 0.02% to about 0.04% by weight of the polycarbonate.

Another embodiment of the present invention provides a polycarbonate composition comprising at least one heat stabilizer. Heat stabilizers used in the presently claimed compositions are agents which impart heat and color stability to the polycarbonate compositions during injection molding.

The polycarbonate compositions of the present invention comprise from 0% to about 0.05% by weight of the polycarbonate of at least one heat stabilizer. Preferably, said compositions comprise from about 0.01% to about 0.03% by weight of the polycarbonate of at least one heat stabilizer.

Heat stabilizers known to one skilled in the art can be effectively used in the present invention. When present, said heat stabilizer is preferably at least one phosphite-based compound, with tris(2,4-ditert-butylphenyl)phosphite and tris-nonylphenylphosphite being particularly preferred.

Yet another embodiment of the present invention provides a polycarbonate-containing composition comprising at least one non-acidic antistatic agent. A variety of non-acidic antistatic agents, either alone or in combination, can be used in the compositions of the present invention. Useful antistatic agents are those which maintain the static charge of the CDs between about −2 kV and about +2 kV. A comprehensive list of antistatic agents is as described in *Modern Plastics Encyclopedia*, McGraw Hill, October 1991, pp. 164–167, and is incorporated herein by reference.

The polycarbonate compositions of the present invention comprise from about 0.007 wt. % to about 0.05 wt. % by weight of the polycarbonate of at least one antistatic agent. A composition comprising from about 0.01 wt. % to about 0.03 wt. % by weight of the polycarbonate of at least one antistatic agent is preferred. Suitable antistatic agents include distearylhydroxylamine, triphenyl amine, tri-n-octylphosphine oxide, triphenyl phosphine oxide, pyridine N-oxide, ethoxylated sorbitan monolaurate, poly(alkylene glycol) compounds of the types shown in formula III, and compounds of the types shown in formula IV. As used herein, the term poly(alkylene glycol) moiety refers to at least one of a poly(ethylene glycol) moiety and a poly (propylene glycol) moiety. Poly(ethylene glycol) moiety may also be designated polyoxyethylene, and poly (propylene glycol) moiety may also be designated polyoxypropylene.

Formula III

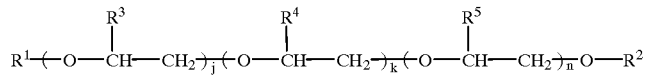

Formula IV

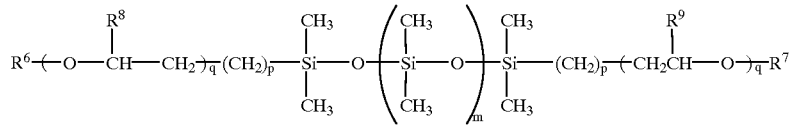

Mold release agents known to one skilled in the art are useful in the present invention. A comprehensive list of mold release agents may be found in Kirk-Othmer Encyclopedia of Chemical Technology, 4th edition, vol. 21, pp. 207–218 (1997) which is incorporated herein by reference. Preferred mold release agents are pentaerythritol tetrastearate, glycerol monostearate, or glycerol tristearate, with pentaerythritol tetrastearate and glycerol monostearate being particularly preferred.

In formula III $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or -tetrahydrofurfuryl; $R^3$, $R^4$, and $R^5$ each independently represent —H or —$CH_3$; and j, k, and n each independently represent an integer from about 2 to about 200. In formula IV $R^6$ and $R^7$ independently represent —H, —$C_{1-22}$ alkyl, or —$COC_{1-21}$ alkyl; $R^8$ and $R^9$ independently represent —H or —$CH_3$; p independently at each occurrence represents an integer from about 1 to about 6; q independently at each occurrence represents an integer from about 1 to about 100; and m represents an integer from about 1 to about 100.

As used herein the term alkyl group includes straight chain alky, branched alkyl, and cycloalkyl. Said alkyl groups may be saturated or have at least one point of unsaturation. When unsaturated alkyl groups are employed, preferably they have at most one point of unsaturation. Said alkyl groups may be unsubstituted or substituted. When substituted alkyl groups are employed, preferable substituents are aryl, carboxylic acid, or hydroxyl. The most preferred substituted alkyl groups are carboxylic acid-substituted $C_{1-4}$ alkyl, and hydroxy-substituted $C_{2-4}$ alkyl. Any of the alkyl groups defined above are useful as substituents in antistatic agents of formula III or formula IV in the compositions of the present invention.

Aryl groups, when present as substituents on antistatic agents of formulas III and IV used in the compositions of the present invention, include mono-, bi-, and tricyclic aromatic hydrocarbon moieties, such as phenyl, naphthyl, and anthracenyl, which are unsubstituted, or substituted with one to three substituents. Illustrative substituents include $C_{1-22}$ alkyl and halogen. Alkyl groups when present as substituents on said aryl groups comprise those alkyl groups defined previously. Preferred alkyl groups are $C_{1-9}$ straight chain alkyl. Halogen substituents, when present on said aryl groups, are preferably bromine or chlorine.

A further preferred composition is one wherein the antistatic agent is derived from at least one compound of the types represented in formula III and formula IV, and $R^1$ and $R^2$ are the same and are both —H, —$C_{1-22}$ alkyl, —$COC_{1-21}$ alkyl, unsubstituted —$C_{6-14}$ aryl, alkyl-substituted —$C_{6-14}$ aryl, or —tetrahydrofurfuryl; $R^3$, $R^4$, and $R^5$ are the same and are each —H or —$CH_3$; $R^6$ and $R^7$ are the same and are both —H; $R^8$ and $R^9$ are the same and are both —H; j, k, and n are each independently an integer from about 2 to about 50; p at each occurrence is 3; q independently at each occurrence represents an integer from about 1 to about 50; and m represents an integer from about 7 to about 80.

The most preferred antistatic agents used in the present invention are ethoxylated sorbitan monolaurate, polyoxyethylene (9) fatty acid ester of coconut oil, polyoxyethylene (4) lauryl ether, polyoxyethylene (20) oleyl ether, or polyoxyethylene (2) stearyl ether. The numbers in parentheses refer to the approximate average number of oxyethylene repeat units in the antistatic agent.

Mixtures of antistatic agents are particularly suitable for use in the polycarbonate-containing compositions of this invention. As used herein mixture of antistatic agents refers both to a mixture of two or more species each from a different chemical class of antistatic agents, or to a mixture of two or more species from the same chemical class of antistatic agents. Examples of mixtures of antistatic agents from different chemical classes include mixtures of polyoxyethylene stearyl ether with tri-n-octylphosphine oxide, or mixtures of triphenyl phosphine oxide with ethoxylated sorbitan monolaurate. Examples of mixtures of antistatic agents from the same chemical class include mixtures of polyoxyethylene (2) stearyl ether with polyoxyethylene (4) stearyl ether, or polypropylene glycol (20) with polypropylene glycol (18), and similar mixtures. Further examples include mixtures of esters of poly(alkylene glycol)s formed through reaction of poly(alkylene glycol)s with two or more different fatty acids such as $C_8$, $C_{10}$, $C_{12}$, $C_{14}$, $C_{16}$, and $C_{18}$ fatty acids, or mixtures of ethers of poly(alkylene glycol)s formed through reaction of poly(alkylene glycol)s with two or more different $C_{8-22}$ alkyl groups. The mixture of polyoxyethylene esters of coconut oil fatty acids is an example of a mixture of antistatic agents from the same general chemical class. Still further examples include mixtures of mono- and diesters of fatty acids with poly(alkylene glycol)s, or mixtures of mono- and diethers of $C_{8-22}$ alkyl groups with poly(alkylene glycol)s. Mixtures of two or more antistatic agents from the same general chemical class are particularly preferred in the compositions of the present invention.

Another embodiment of the present invention provides optical information storage media comprising compositions provided by the present invention. Optical information storage media include such articles as compact disks, audio disks, laser disks, optical disk memories and magnetic-to-optical disks to which information may be written and from which it may be read by laser.

It has been discovered that surprisingly low levels of antistatic agents which comprise at least one poly(alkylene glycol) moiety result in changing the magnitude or static charge sign, or both the magnitude and static charge sign, of CDs made using the polycarbonate prepared by the melt transesterification of diphenylcarbonate with bisphenol A. The resulting static charge sign and magnitude are controlled by both the type and amount of the antistatic agent or mixture of antistatic agents used.

The manner of addition of mold release agent, heat stabilizer, and antistatic agent to the polycarbonate composition is not particularly critical. In one method for employing the present invention the mold release agent, heat stabilizer, and antistatic agent may be compounded by combining all the said materials with polycarbonate pellets or powder (or a mixture of pellets and powder) in a container followed by vigorous mixing and then extrusion. Another suitable method involves making a concentrate of at least one of the materials in polycarbonate powder (or a mixture of powder and pellets). Preferably, the concentrate may be made by combining polycarbonate powder with at least one of the materials in a container followed by vigorous mixing and then extrusion. The level of mold release agent, heat stabilizer, antistatic agent or mixtures thereof in the concentrate may range from about 0.14 wt. % to about 2.2 wt. % by weight of the polycarbonate. Most preferably, the concentrate is prepared by combining polycarbonate powder with antistatic agent at a concentration of from about 0.14 wt. % to about 1.0 wt. % by weight of the polycarbonate.

After preparation, the concentrate may be compounded with polycarbonate pellets by extrusion utilizing a powder concentrate feeder and bulk pellet feeder. A convenient ratio of bulk polycarbonate feed to concentrate feed is 95:5 although other ratios are also suitable. Related mixing and compounding processes known to those skilled in the art are also suitable.

The invention is illustrated by the following examples.

EXAMPLES

Polycarbonate compositions were compounded by extrusion using a 5 barrel W&P 28 mm twin screw extruder (TSE) with a barrel set temperature of 260° C. and a total feed rate of 20 lbs./hr. The screw speed was 325 rpms. Extrudate samples were molded into circular test plaques, about 10.1 cm. in diameter and about 0.3175 cm. in thickness. The "as molded" static charge was measured using a Meech 980 hand-held static field meter, by using procedures known to one skilled in the art, measured at a distance of 5.0 cm from the center of a 7.6 cm diameter test plaque.

Different antistatic agents are listed in Table 1. ATMER® is a registered trademark of ICI Americas Inc.

TABLE 1

| Tradename | Antistatic Agent |
|---|---|
| ATMER ® 100 | Sorbitan monolaurate |
| ATMER ® 110 | Ethoxylated sorbitan monolaurate |
| ATMER ® 135 | Polyoxyethylene (4) lauryl ether |
| ATMER ® 137 | Polyoxyethylene (20) oleyl ether |
| ATMER ® 154 | Polyoxyethylene (9) fatty acid ester of coconut oil |
| ATMER ® 502 | Polyoxyethylene (2) stearyl ether |
| DMS C-21 | Poly(dimethylsiloxane)-co-4% poly(ethylene glycol); MW 4500–5500 |

Table 2 lists compositions comprising different amounts of antistatic agents, and the static charge of the test plaques made using these compositions.

TABLE 2

| # | Antistatic Agent | Amount (wt. %) | Static Charge (kV) |
|---|---|---|---|
| 1. | none | — | −2.2 |
| 2. | ATMER ® 110 | .03 | +1.2 |
| 3. | ATMER ® 137 | .025 | +1.2 |
| 4. | ATMER ® 154 | .02 | +1.3 |
| 5. | ATMER ® 502 | .025 | +0.6 |
| 6. | poly(propylene glycol) (20) | .05 | +0.9 |
| 7. | PEG (9) octyl phenol | .03 | +1.3 |
| 8. | DMS C-21 | .03 | −1.0 |
| 9. | distearylhydroxylamine | .01 | +0.8 |
| 10. | triphenyl phosphine oxide | .02 | −0.2 |
| 11. | pyridine N-oxide | .013 | −0.8 |
| 12. | triphenyl amine | .05 | +0.9 |
| 13. | tri-n-octylphosphine oxide | .0075 | +0.4 |

The amounts of antistatic agent added to the composition represent weight % based on polycarbonate. Composition #1 of Table 2, which does not contain any antistatic agents, has a static charge of −2.2 kV, which is outside the desired range. On the other hand compositions #2–13 of Table 2 which comprise at least one antistatic agent of the instant invention have a static charge in the desired range of about −2 kV to about +2 kV.

Antistatic agents which were effective for controlling the static charge in molded test plaques of Table 2 were also effective for controlling static charge in molded compact disks in the presence of a mold release agent. "As molded" static charge was measured for "green" (unmetallized) compact disks molded on a Netstal Disk Jet 600 CD molding machine. Static properties of compact disks made from polycarbonate compositions containing varying levels of ATMER® 154 antistatic agent and glycerol monostearate (GMS) mold release agent are tabulated in Table 3. The amounts of each additive in the composition represent weight % based on polycarbonate.

TABLE 3

| # | ATMER ® 154 | GMS | Static Charge |
|---|---|---|---|
| 1. | 0 | .04 | −5.1 |
| 2. | 0 | .10 | −5.1 |
| 3. | .02 | .04 | +0.2 |
| 3. | .02 | .02 | −1.8 |

It was found that the static charge for molded compact disks fell outside the desirable range of between about −2 kV and about +2 kV when mold release agent alone was present and no antistatic agent was added (composition #1, Table 3). Acceptable values for static charge were achieved by adding the antistatic agent in very small amounts (0.02 wt. % by weight of the polycarbonate) in the presence of mold release agent.

"As molded" static charge was measured for "green" (unmetallized) compact disks molded on a Krauss Maffei CD molding machine. Static properties of compact disks made from polycarbonate compositions containing varying levels of ATMER® 110 antistatic agent are tabulated in Table 4. The amounts of antistatic agent added to the composition represent weight % based on polycarbonate. All the compositions also contain 0.04 wt. % based on polycarbonate of glycerol monostearate as mold release agent and 0.01 wt. % based on polycarbonate of tris(2,4-ditert-butylphenyl)phosphite as heat stabilizer.

TABLE 4

| # | Antistatic Agent | Amount (wt. %) | "As molded" Static Charge (kV) |
|---|---|---|---|
| 1. | none | — | −4.2 |
| 2. | ATMER ® 110 | .005 | −3.2 |
| 3. | ATMER ® 110 | .01 | −1.8 |
| 4. | ATMER ® 110 | .02 | +2.1 |
| 5. | ATMER ® 110 | .03 | +3.0 |
| 6. | ATMER ® 110 | .05 | +5.2 |
| 7. | ATMER ® 154 | .025 | −1.3 |
| 8. | Polyoxyethylene (20) monooleate | .025 | −2.3 |
| 9. | Polyoxyethylene (10) monolaurate | .025 | −1.4 |
| 10. | Polyoxyethylene (10) monostearate | .025 | +1.0 |

It was found that the static charge for molded compact disks fell outside the desirable range of between about −2 kV and about +2 kV when mold release agent alone was present and no antistatic agent was added (composition #1, Table 4). Depending upon the antistatic agent used, acceptable values for static charge were achieved by adding the antistatic agent in very small amounts between about 0.01 wt. % and about 0.025 wt. % by weight of the polycarbonate. Addition of antistatic agent both in smaller amounts (0.005 wt. % based on polycarbonate) as well as in higher amounts (0.03 wt. % and 0.05 wt. % based on polycarbonate) gave values of static charge outside the desired range of about −2 kV and about +2 kV at the given level of mold release agent.

In the presence of a mold release agent the use of antistatic agent containing at least one poly(alkylene glycol) moiety is particularly effective even at very low amounts (<0.03 wt. %) towards controlling the static charge for CDs molded using polycarbonate resin prepared by a melt process. By adding an effective amount of the antistatic additive in the presence of mold release agent the static charge of the CDs molded from these compositions can be maintained between about −2 kV and about +2 kV, preferably as close to zero as possible, to minimize the static charge generated during the molding process. Particular amounts of poly (ethylene glycol) fatty acid esters and ethoxylated sorbitan monolaurate (ATMER® 110) were effective in the presence of glycerol monostearate as mold release agent.

Silicone-based antistatic agents are also useful in the compositions of present invention. Table 5 lists the amount of silicone-based antistatic agent used in the polycarbonate compositions of the present invention, and the corresponding static charge measured on test plaques. The silicone-based antistatic agents employed were compounds of formula IV where substituents $R^6$ and $R^7$ are each —H, $R^8$ and $R^9$ are each —H, and p at each occurrence is 3. In the table the term non-siloxane % refers to the % poly(ethylene glycol) in the silicone-based antistatic agent.

The values given in the table for q and for m are representative values and are not meant to be limiting. Those skilled in the art will recognize that values for q and m outside the ranges listed in the table are also useful in the compositions of this invention. The amounts of antistatic agent added to the composition represent weight % based on polycarbonate.

TABLE 5

| Sample # | m | q | Mol. Wt. | non-Siloxane % | Amt. Added | Static Charge (kV) |
|---|---|---|---|---|---|---|
| A | 9 | 1 | 1000 | 20 | .03 | −0.52 |
| B | 56–69 | 1 | 4500–5500 | 4 | .03 | −2.4 |
| C | 17–23 | 10–13 | 3500–4500 | 60 | .03 | +1.7 |

It was found that the static charge for molded test plaques fell within the desirable range of between about −2 kV and about +2 kV at about 0.03 wt. % of antistatic agent based on polycarbonate.

What is claimed is:

1. A composition comprising:
   (a) polycarbonate;
   (b) from about 0.01% to about 0.1% by weight of the polycarbonate of at least one mold release agent;
   (c) from 0% to about 0.05% by weight of the polycarbonate of at least one heat stabilizer; and
   (d) from about 0.007% to about 0.05% by weight of the polycarbonate of at least one antistatic agent, wherein the antistatic agent is distearylhydroxylamine, triphenyl amine, tri-n-octylphosphine oxide, triphenyl phosphine oxide, pyridine N-oxide, ethoxylated sorbitan monolaurate,

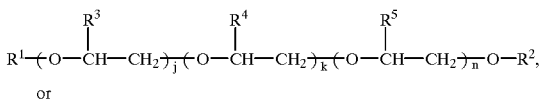

or

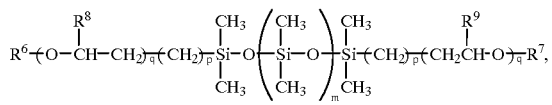

wherein $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or -tetrahydrofurfuryl;

$R^3$, $R^4$, and $R^5$ each independently represent —H or —$CH_3$;

$R^6$ and $R^7$ independently represent —H, —$C_{1-22}$ alkyl, or —$COC_{1-21}$ alkyl;

$R^8$ and $R^9$ independently represent —H or —$CH_3$;

j, k, and n each independently represent an integer from about 2 to about 200;

p independently at each occurrence represents an integer from about 1 to about 6;

q independently at each occurrence represents an integer from about 1 to about 100; and m represents an integer from about 1 to about 100.

2. The composition of claim 1 comprising from about 0.015% to about 0.06% by weight of the polycarbonate of at least one mold release agent.

3. The composition of claim 1 comprising from about 0.02% to about 0.04% by weight of the polycarbonate of at least one mold release agent.

4. The composition of claim 1 wherein the mold release agent is pentaerythritol tetrastearate, glycerol monostearate, or glycerol tristearate.

5. The composition of claim 1 wherein the heat stabilizer is tris(2,4-ditert-butylphenyl)phosphite or tris-nonylphenylphosphite.

6. The composition of claim 1 comprising from about 0.007% to about 0.03% by weight of the polycarbonate of at least one antistatic agent.

7. The composition of claim 1 wherein the antistatic agent comprises at least one compound with structure

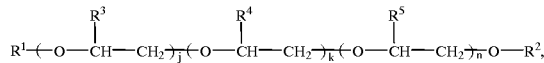

wherein $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or -tetrahydrofurfuryl;

$R^3$, $R^4$, and $R^5$ each independently represent —H or —$CH_3$; and j, k, and n each independently represent an integer from about 2 to about 200.

8. The composition of claim 7, wherein the antistatic agent comprises at least one compound with structure

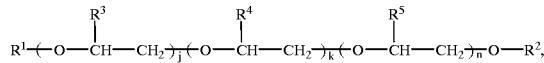

wherein $R^1$ and $R^2$ are both —H;

$R^3$, $R^4$, and $R^5$ are each —$CH_3$; and j, k, and n each independently represent an integer from about 2 to about 50.

9. The composition of claim 7, wherein the antistatic agent comprises at least one compound with structure

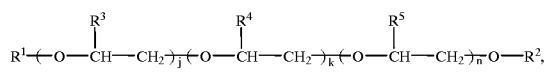

wherein $R^1$ and $R^2$ are both —$COC_{1-21}$ alkyl;

$R^3$, $R^4$, and $R^5$ are each —H; and j, k, and n each independently represent an integer from about 2 to about 50.

10. The composition of claim 7, wherein the antistatic agent comprises at least one compound with structure

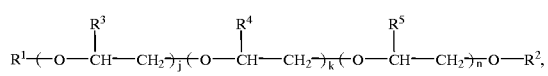

wherein $R^1$ and $R^2$ are both —$C_{1-22}$ alkyl;

$R^3$, $R^4$, and $R^5$ are each —H; and j, k, and n each independently represent an integer from about 2 to about 50.

11. The composition of claim 1 wherein the antistatic agent comprises at least one compound with structure

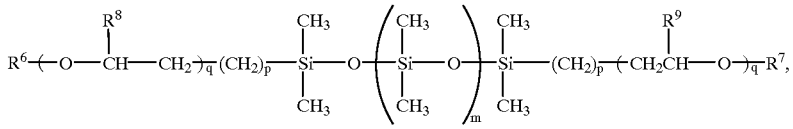

wherein $R^6$ and $R^7$ independently represent —H, —$C_{1-22}$ alkyl, or —$COC_{1-21}$ alkyl;

$R^8$ and $R^9$ independently represent —H or —$CH_3$;

p independently at each occurrence represents an integer from about 1 to about 6;

q independently at each occurrence represents an integer from about 1 to about 100; and m represents an integer from about 1 to about 100.

12. The composition of claim 11 wherein the antistatic agent comprises at least one compound with structure

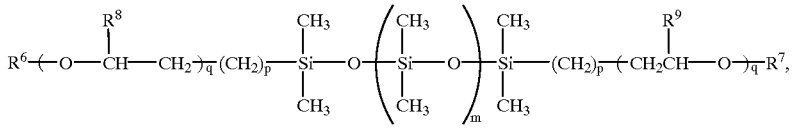

wherein $R^6$ and $R^7$ are each —H;

$R^8$ and $R^9$ are each —H;

p independently at each occurrence is 3;

q independently at each occurrence represents an integer from about 1 to about 50; and m represents an integer from about 7 to about 80.

13. The composition of claim 1 wherein the antistatic agent is at least one of ethoxylated sorbitan monolaurate, polyoxyethylene (9) fatty acid ester of coconut oil, polyoxyethylene (4) lauryl ether, polyoxyethylene (20) oleyl ether, or polyoxyethylene (2) stearyl ether.

14. The composition of claim 1 wherein the antistatic agent is at least one of distearylhydroxylamine, triphenyl amine, tri-n-octylphosphine oxide, triphenyl phosphine oxide, or pyridine N-oxide.

15. An optical information storage medium comprising a composition of claim 1.

16. An optical information storage medium comprising a composition of claim 1 wherein a heat stabilizer is present at a level of from about 0.01% to about 0.1% by weight of the polycarbonate.

17. An optical information storage medium comprising (a) polycarbonate;

(b) from about 0.01% to about 0.1% by weight of the polycarbonate of at least one mold release agent, wherein said mold release agent is glycerol monostearate or pentaerythritol tetrastearate;

(c) from about 0.01% to about 0.05% by weight of the polycarbonate of at least one heat stabilizer, wherein said heat stabilizer is tris(2,4-ditert-butylphenyl) phosphite or tris-nonylphenylphosphite; and (d) from about 0.007% to about 0.05% by weight of the polycarbonate of at least one antistatic agent, wherein said antistatic agent is distearylhydroxylamine, triphenyl amine, tri-n-octylphosphine oxide, triphenyl phosphine oxide, pyridine N-oxide, ethoxylated sorbitan monolaurate, or

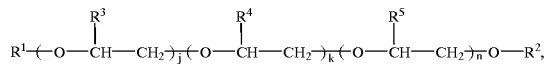

wherein $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or -tetrahydrofurfuryl;

$R^3$, $R^4$, and $R^5$ each independently represent —H or —$CH_3$; and j, k, and n each independently represent an integer from about 2 to about 200.

18. An optical information storage medium comprising (a) polycarbonate;

(b) from about 0.01% to about 0.1% by weight of the polycarbonate of a mold release agent, wherein said mold release agent is glycerol monostearate;

(c) from about 0.01% to about 0.05% by weight of the polycarbonate of a heat stabilizer, wherein said heat stabilizer is tris(2,4-ditert-butylphenyl)phosphite; and (d) from about 0.007% to about 0.05% by weight of the polycarbonate of at least one antistatic agent, wherein said antistatic agent is

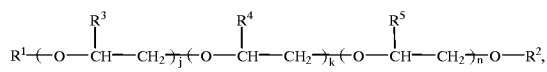

wherein $R^1$ and $R^2$ independently represent —$COC_{1-21}$ alkyl;

$R^3$, $R^4$, and $R^5$ each independently represent —H or —$CH_3$; and j, k, and n each independently represent an integer from about 2 to about 50.

19. A compact disk comprising a composition of claim 1.

20. A compact disk comprising a composition of claim 1 wherein a heat stabilizer is present at a level of from about 0.01% to about 0.1% by weight of the polycarbonate.

21. A compact disk comprising (a) polycarbonate;

(b) from about 0.01% to about 0.1% by weight of the polycarbonate of at least one mold release agent, wherein said mold release agent is glycerol monostearate or pentaerythritol tetrastearate;

(c) from about 0.01% to about 0.05% by weight of the polycarbonate of at least one heat stabilizer, wherein said heat stabilizer is tris(2,4-ditert-butylphenyl) phosphite or tris-nonylphenylphosphite; and (d) from about 0.007% to about 0.05% by weight of the polycarbonate of at least one antistatic agent, wherein said antistatic agent is distearylhydroxylamine, triphenyl amine, tri-n-octylphosphine oxide, triphenyl phosphine oxide, pyridine N-oxide, ethoxylated sorbitan monolaurate, or

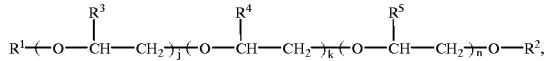

wherein $R^1$ and $R^2$ independently represent —H, —$C_{1-22}$ alkyl, —$COC_{1-21}$ alkyl, unsubstituted —$C_{6-14}$ aryl, alkyl-substituted —$C_{6-14}$ aryl, or -tetrahydrofurfuryl;

$R^3$, $R^4$, and $R^5$ each independently represent —H or —$CH_3$; and j, k, and n each independently represent an integer from about 2 to about 200.

22. A compact disk comprising (a) polycarbonate;

(b) from about 0.01% to about 0.1% by weight of the polycarbonate of a mold release agent, wherein said mold release agent is glycerol monostearate;

(c) from about 0.01% to about 0.05% by weight of the polycarbonate of a heat stabilizer, wherein said heat stabilizer is tris(2,4ditert-butylphenyl)phosphite; and (d) from about 0.007% to about 0.05% by weight of the polycarbonate of at least one antistatic agent, wherein said antistatic agent is

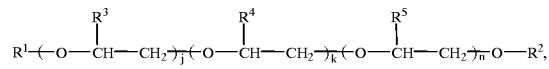

wherein $R^1$ and $R^2$ independently represent —$COC_{1-21}$ alkyl;

$R^3$, $R^4$, and $R^5$ each independently represent —H or —$CH_3$; and j, k, and n each independently represent an integer from about 2 to about 50.

* * * * *